(12) United States Patent
Singh

(10) Patent No.: US 7,642,298 B2
(45) Date of Patent: Jan. 5, 2010

(54) POLYMERIC SURFACTANT

(75) Inventor: Michael Singh, Leeds (GB)

(73) Assignee: Ciba Specialty Chemicals Water Treatments Ltd., West Yorkshire, Bradford (GB)

(*) Notice: Subject to any disclaimer, the term of this patent is extended or adjusted under 35 U.S.C. 154(b) by 380 days.

(21) Appl. No.: 10/559,892

(22) PCT Filed: May 26, 2004

(86) PCT No.: PCT/EP2004/005657

§ 371 (c)(1),
(2), (4) Date: Dec. 6, 2005

(87) PCT Pub. No.: WO2004/111165

PCT Pub. Date: Dec. 23, 2004

(65) Prior Publication Data

US 2006/0135639 A1 Jun. 22, 2006

(30) Foreign Application Priority Data

Jun. 11, 2003 (GB) .................. 0313441.8
Jun. 26, 2003 (GB) .................. 0314833.5

(51) Int. Cl.
- C08F 2/50 (2006.01)
- C08J 3/28 (2006.01)
- B01J 20/32 (2006.01)
- B01J 20/00 (2006.01)
- B01J 20/22 (2006.01)

(52) U.S. Cl. .................. 522/113; 522/84; 522/87; 522/88; 522/89; 522/86; 522/114; 522/115; 522/116; 522/117; 522/118; 522/120; 522/134; 522/122; 522/124; 522/135; 522/138; 522/139; 522/142; 522/143; 522/144; 522/147; 522/149; 427/508; 427/517; 502/400; 502/401; 502/439

(58) Field of Classification Search .................. 522/6, 522/86, 87, 84, 88, 89, 113, 114, 115, 116, 522/117, 118, 120, 212, 122, 124, 134, 135, 522/136, 138, 139, 142, 143, 144, 147, 149; 8/115.53; 99/6; 502/400, 401, 439

See application file for complete search history.

(56) References Cited

U.S. PATENT DOCUMENTS

| | | | | |
|---|---|---|---|---|
| 3,090,664 A | * | 5/1963 | Cline et al. | 8/115.53 |
| 3,092,512 A | | 6/1963 | Magat et al. | 117/138.8 |
| 4,357,184 A | * | 11/1982 | Binet et al. | 149/2 |
| 4,846,994 A | | 7/1989 | Kud et al. | 252/174.21 |
| 4,846,995 A | * | 7/1989 | Kud et al. | 510/360 |
| 4,999,869 A | * | 3/1991 | Holland et al. | 8/115.62 |
| 5,231,131 A | * | 7/1993 | Chu et al. | 524/504 |
| 5,635,554 A | | 6/1997 | Boeckh et al. | 524/377 |
| 5,753,759 A | * | 5/1998 | Hartmann et al. | 525/218 |
| 6,384,100 B1 | | 5/2002 | Choi | 522/46 |
| 6,818,050 B1 | * | 11/2004 | Nyssen | 106/401 |

FOREIGN PATENT DOCUMENTS

| | | |
|---|---|---|
| EP | 0 198 307 | 10/1986 |
| EP | 0 268 705 | 6/1988 |
| EP | 0 357 149 | 3/1990 |
| GB | 922 457 | 4/1963 |
| GB | 1032505 | 6/1966 |
| GB | 1 439 132 | 6/1976 |
| GB | 2 002 400 | 2/1979 |
| GB | 2 116 205 | 9/1983 |
| JP | 4080266 | 4/1992 |
| WO | 92/09650 | 6/1992 |
| WO | WO/00/60015 | * 10/2000 |
| WO | 01/34388 | 5/2001 |
| WO | 01/60901 | 8/2001 |

OTHER PUBLICATIONS

Gulina et al, "Fibre Chemisorbents Based on Modified Graft Copolymers of Cellulose and Polycaproamide", Fibre Chemistry, vol. 34, No. 6, 2002.*
WPI Abstract No. 1994-211751[26]of JP 6148416.
WPI Abstract No. 1992-138045[17] of JP 4080266.
K. Stueben, Polymer Science and Technology, vol. 29, pp. 319-350 (1984).

* cited by examiner

Primary Examiner—Sanza L McClendon
(74) Attorney, Agent, or Firm—Shiela A. Loggins

(57) ABSTRACT

A polymeric surfactant formed by the reaction of an oligomeric or polymeric substrate with at least one ethylenically unsaturated monomer, wherein the reaction is conducted in the presence of a type II photo initiator and by the action of actinic radiation. The polymeric surfactant is useful for stabilising the interface in emulsions or dispersions.

2 Claims, No Drawings

POLYMERIC SURFACTANT

The present invention concerns novel polymeric surfactants and methods of making them. These polymeric surfactants are particularly suitable for making emulsions and dispersions.

Polymeric surfactants are frequently used for interacting with the interface in a variety of multiphase systems. By multiphase systems, we include systems that contain two or more phases, such as emulsions and dispersions. In the preparation and/or stabilisation of emulsions and dispersions, it is common practice to employ a polymeric surfactant in order to stabilise the interface between the continuous and discontinuous phases. Typically polymeric surfactants comprise a portion of the polymer molecule which has an affinity for one phase and a portion which has an affinity for the other phase. Such a polymeric surfactant may be a block copolymer containing a block of hydrophobic repeating monomer units and a block of hydrophilic repeating monomer units. The polymeric surfactants can be graft polymers containing a main polymeric or oligomeric backbone, having an affinity for one phase, and pendant polymeric or oligomeric chains, having an affinity for another phase.

GB-A-2002400 reveals surfactants which are blends of oil soluble copolymers with conventional surfactants for use in the emulsification of water in hydrocarbon fuel oils. The polymers can be block polymers or graft polymers and comprise at least two polymeric components derived from an oil soluble complex monocarboxylic acid, obtained by interesterification of one or more mono hydroxy-monocarboxylic acids together with a hydroxyl free monocarboxylic acid acting as a chain terminator and a polymeric component derived from a water soluble polyalkylene glycol.

GB-A-2116205 describes polymeric surfactants for the emulsification of methanol or ethanol in hydrocarbon liquids, such as diesel oil. The surfactant comprises a blend of a first element which is either a block polymer or a graft polymer which is the residue of an oil soluble complex monocarboxylic acid and another polymeric component which is the residue of a water-soluble polyalkylene glycol or polyalkylene oxy polyol and a second element which is a conventional non-ionic, non polymeric surfactant. The block or graft polymers can be prepared in the same manner as described in GB-A-2002400.

WO-A-01/60901 discloses low foaming surfactants which are water-soluble or water dispersible branched polymeric compounds. The branched compounds are the based catalysed reaction products of a first component which is a C 3 to 10 alkane trihalide or a C 3 to 10 halo alkane substituted by two epoxy oxygen atoms each of which are attached to two adjacent carbon atoms of the halo alkane and a second component which is an organic group of up to 36 carbon atoms carrying hydroxy, amino or thiol groups. The hydroxy, amino or thiol groups can be separated from the organic group by an alkoxy group and which contains up to 200 repeating units.

EP-A-357149 concerns stable emulsion formulations of water insoluble organic pesticides, prepared by mixing the pesticide with an aqueous dispersions of a graft copolymer surfactant. This polymeric surfactant comprises a reactive polymeric surfactant base polymer and a nonionic hydrophobic grafted composition. The polymer comprises a hydrophilic backbone with pendant grafted hydrophobic groups. It is stated that the surfactants may be obtained by a combination of pH independent anionic monomers, such as sulphonate monomers, and nonionic monomers containing hydrophobic and hydrophilic units. The reactive polymeric surfactant contains grafting sites which are typically vinyl groups linked to the backbone through an ester, amide or quaternary ammonium connection. Side chains are bonded to the reactive surfactant at the grafting sites. The side-chain is a copolymer formed from ethylenically unsaturated monomers, for example styrene, acrylates or meth acrylates etc. Thus the graft polymer is formed from a base polymer which carries ethylenically unsaturated functionalites that can be polymerised with a hydrophilic monomers or groups which will copolymerise with the hydrophobic monomers.

EP-A-198307 relates to a coating composition comprising a graft copolymer having surfactant properties. The copolymer is the reaction product of an anhydride copolymer with a vinyl copolymer comprising vinyl chloride, carboxylic ester, and a source of hydroxyl groups. The anhydride copolymer comprises the reaction product of an aromatic monomer and a dicarboxylic acid anhydride.

EP-A-268705 describes a polymeric surfactant which is a block copolymer comprising chemically linked polymeric blocks. The first block part of the polymer consists of homo- or copolymerised non polar monomeric ethylenically unsaturated compounds and a second block consists of ethylenically unsaturated monomer containing an epoxy group that has been transformed into an ionic group.

Graft polymeric surfactants described in the aforementioned references are all prepared by processes involving either the formation of a base polymer which carries ethylenically unsaturated groups onto which ethylenically unsaturated monomers are grafted or the formation of a base polymer which carries a functional group onto which molecules can be grafted.

Graft polymers are particularly suitable as polymeric surfactants since they will typically contain a backbone which will preferentially associate with one phase and grafted moieties which preferentially associate with a different phase.

However, graft polymers suitable as surfactants are generally difficult to make and often involved a first macro monomer which has a reactive end group which is then subjected to a second polymerisation process. This is difficult to achieve in good yields and tends to be restricted to short chain molecules and/or low concentrations because of viscosity limitations. Alternatively, graft polymers can be prepared by reacting molecules, for instance polymer chains, containing a reactive end group that reacts with reactive groups and a base polymer substrate. However, the preparation of the base polymer and molecules containing said reactive groups and then reacting these two preformed entities together is complex and can be difficult to prepare in a sufficiently high yield. A further difficulty is that the process can be difficult to control can lead to problems with product quality.

The preparation of graft polymers in general is well-documented in the prior art. Numerous methods are given in the literature for preparing a multitude of different types of graft polymers, covering a variety of different chemical structures and physical forms. Typically graft polymers described in the literature are used for a variety of applications. In general the preparation of a specific graft polymer, having particular properties designed for a particular application, is dependent upon the choice of starting materials and the process conditions.

An example of the preparation of graft polymers includes GB 922457, which reveals a process for making graft copolymers by dissolving a polyalkylene glycol in at least one monomer, such as vinyl esters and esters of acrylic or methacrylic acid, either in the presence or the absence of a solvent. The process employs a free radical polymerisation catalyst under the action of actinic light. Dibenzoyl peroxide is proposed as an initiator, which can decompose thermally or by ultraviolet light. This process would involve a type I photo initiation.

U.S. Pat. No. 4,846,994 and U.S. Pat. No. 4,846,995 each propose the use of graft polymers prepared according to GB 922457 as greyness inhibitors in the wash and after treatment of textiles. U.S. Pat. No. 5,635,554 describes low viscosity formulations containing graft polymers made in the same way for use as viscosity reducing additives.

An article entitled, "Ultraviolet cured pressure sensitive adhesives", Kenneth C Stueben, Union Carbide Corporation, Polymer Science and Technology, 1984 (29) 319-350, describes photo cure of mono- and multifunctional acrylate-poly ethers-benzophenone blends. Grafting is effected by ultraviolet radiation. The reference suggests that carbamyloxy alkyl acrylates can be grafted onto polyethylene oxides of molecular weight 1700 to 90,000 preferably 2500 to 21,000. The graft polymer thus formed would tend to have a high molecular weight in order to function as a pressure sensitive adhesive.

GB 1439132 discloses a method for the production of a hydrophilic grafted polymer product. Gamma radiation is used to generate radicals along a hydrophobic polymer backbone from which hydrophilic monomer will polymerise. The process does not use a chemical polymerisation initiator.

GB 1032505 also reveals preparing graft copolymers using high energy radiation or by chemical free radical generating catalysts.

An objective of the present invention is to provide a polymeric surfactant by an alternative and more convenient route. It is also an objective to provide a range of polymeric surfactants which are particularly suitable for stabilising water in oil emulsions, oil in water emulsions, dispersions of solids in an aqueous medium and dispersions of solids in a oil based medium.

According to one aspect of the invention we provide a polymeric surfactant formed by the reaction of an oligomeric or polymeric substrate with at least one ethylenically unsaturated monomer, wherein the reaction is conducted in the presence of a type II photo initiator and by the action of actinic radiation.

The action of the actinic radiation upon the photo initiator induces photo-initiation. In principle there are two types of photoinitiation mechanisms according to the process by which the initiating radicals are formed. Compounds undergoing homolytic cleavage are termed type I photoinitiators, which is not the case in the present invention, and compounds that interact with a second molecule (known as co-initiators) as in the present invention, are known as type II photo initiators. The reaction pathways available for Type II photoinitiators are via hydrogen abstraction or electron transfer (followed by proton transfer) mechanisms, but under certain conditions both mechanisms may be involved.

These type II photoinitiations thus require co-initiators (usually hydrogen donating compounds typified by amines, alcohols, thiols or ethers) generating the radicals that trigger polymerisation and thus this type of initiation has the potential to incorporate hydrogen donating compounds into polymers (i.e. photografted polymers). However, photo initiated graft polymerisation using type II initiators has previously only been used to prepare hard resinous solids or adhesives.

Generally in the preparation of graft polymeric surfactants it can be difficult to control the molecular weight, in particular the molecular weight of the pendant graft polymer chains. Furthermore, the overall structure of the graft polymer is critical in order to provide the right balance of lipophilic and hydrophilic characteristics. Surprisingly, we have been able to provide a graft polymer, which is suitable as a surfactant, using a photo initiated graft polymerisation process employing type II photo initiators. Thus the process not only has the advantage in terms of convenience, but also can be controlled easily to provide a surfactant with the right properties for a given application. Hence the present invention conveniently provides a range of surfactants suitable for a variety of multiphase systems. The surfactants of the present invention have a unique molecular structure and in particular comprise polymer chains, formed from the chosen monomer, grafted directly onto the substrate by covalent bonding at a position on the substrate previously occupied by hydrogen atoms.

The multiphase systems which can be stabilised by the surfactants of the present invention include combinations of various immiscible liquids, for instance as emulsions or dispersions of particulate solids in a variety of liquids. Therefore, the surfactant will possess moieties which will associate with each of the liquid phases in liquid liquid systems or moieties which associate with the liquid phase and the surface of the solid-phase in dispersions of solids. Such liquid liquid systems include emulsions of organic polar liquids in non polar hydrocarbons. Preferably the liquid liquid systems include one phase which is aqueous, for instance water in oil emulsions or oil in water emulsions. Therefore a preferred polymeric surfactant will contain hydrophilic portions which associate with the aqueous phase and hydrophobic and/or lipophilic portions which associate with an oil phase. Preferably the polymeric surfactant is an amphiphilic polymer.

The polymeric surfactants according to the invention may be used in any of the typical applications of surfactants. When the surfactants are used to stabilise the interface between phases of multiphase compositions, the polymeric surfactant is desirably soluble or at least dispersible in one or more of the phases. In one preferred system the polymeric surfactant is water-soluble. In another preferred system the polymeric surfactant is oil soluble.

It is important that the polymeric surfactant has a molecular structure and size, which enables it to partition into a liquid phase and to be able to form micelles and/or associate with the interface of another phase. If the molecular weight is too high, the polymer will not readily function as a surfactant. Typically the molecular weight should be below 100,000, preferably below 50,000. Usually the surfactant has a molecular weight in excess of 1,000, for instance in the range of 2,000 or 3,000 to 50,000. More preferred molecular weights are from 5,000 for 25,000, especially 10,000 to 20,000.

The polymeric surfactant should be prepared from a substrate, to which grafting of ethylenically unsaturated monomers is enabled using a type II photo initiator. In this process a substrate may be regarded as a co initiator for the type II photo initator. Therefore, although separate co initiators are not precluded, and for some systems may be beneficial, inclusion of a co initiator additional to the substrate is not essential. Typically, the substrate can be any natural polymer, sugars, vinyl addition polymers, polyethers, synthetic or semisynthetic condensation polymers, or inorganic substances and in which the substrate contains one or more abstractable hydrogen atoms. Examples of preferred substrates include substances selected from the group consisting of polyalkylene oxides, polyalkylene glycols, (meth)acrylamide polymers, (meth)acrylic acid polymers (esters or salts thereof), polyvinyl alcohol, polyvinyl acetate, polyvinylpyrrolidone, polyethylenimine, polyesters, polyamides, sugars, polysaccharides, amino acids, proteins, natural oils such as Castor oil and inorganic substances containing abstractable hydrogen.

The at least one ethylenically unsaturated monomer which is grafted onto the substrate can be any monomer which readily undergoes direct reaction with the activated sites on the substrate. The activated sites on the substrate would be at a position where the type II photo initiator has generated a radical. The monomer molecule will react through the double bond and become covalently bonded directly to the substrate. The monomer unit would carry a radical onto which a further monomer molecule will react through the double bond and this process will continue to form a grafted polymer chain. Of course further polymer chains could be formed off these formed polymer chains by a similar process resulting in secondary grafting. Suitably the monomer comprises any one of acrylic, vinylic and allylic monomers.

The choice of monomer will normally depend upon the properties required for the polymeric surfactant. Therefore, an oil soluble surfactant which stabilises an aqueous dispersed phase in an oil may be prepared by grafting hydrophobic monomers onto a water soluble substrate. For the reverse system, a water-soluble surfactant which stabilises an oil phase in water can be made by grafting hydrophilic monomers on to a hydrophobic substrate. Examples of suitable monomers for use in the present invention include any in the group consisting of (meth)acrylamides, N-vinyl pyrrolidinone, hydroxy ethyl acrylate, (meth)acrylic acid or salts thereof, maleic acid or salts thereof, itaconic acid or salts thereof, 2-acrylamido-2-methyl propane sulfonic acid or salts thereof, vinyl sulfonic acid, allyl sulfonic acid, dialkyl amino alkyl (meth)acrylates or quaternary ammonium or acid addition salts thereof, dialkyl amino alkyl (meth)acrylamides or quaternary ammonium or acid addition salts thereof, diallyl dialkyl ammonium halide, styrenes, C1-30 alkyl(meth)acrylates, (meth)acrylonitrile and halogenated vinylic monomers, such as vinylidene chloride or vinyl chloride.

The weight ratio of substrate to grafted moiety (i.e. portion formed from the ethylenically unsaturated monomer) is desirably in the range of 99:1 to 1:99. Preferably the ratio would be in the range 50:1-1:50.

The type II photo initiator may be any substance which is capable of a photoreaction with a so-called co initiator or substrate to form a radical when exposed to a suitable actinic radiation. Preferably, the photo initiator may be any one of benzophenone, diaryl ketones, xanthones, thioxanthones, acridones, anthraquinones, diketones, ketocoumarines or imides. If the photoreaction is performed in water or a polar solvent, the use of water-soluble type II photoinitiators, such as the salts of ammoniumalkyl or sulfonylalkyl derivatives of benzophenones or thioxanthones, may be preferable. It is further possible to use type II photoinitiators substituted by co-polymerisable groups that are co-polymerised with the growing side chain, or type II photoinitiators that are bound to a polymer backbone. It is in addition possible to use blends of one or more of the previously mentioned type II photoinitiators. Actinic radiation includes any electromagnetic radiation capable of initiating photochemical reactions. The choice of actinic radiation will depend upon the particular initiator used and will also depend to some extent on the reactants and if used the solvent. Desirably the actinic radiation includes electromagnetic radiation selected from the group consisting of ultraviolet light, infrared light, and visible light.

According to a further aspect of the invention we provide a method of producing a polymeric surfactant comprising contacting an oligomeric or polymeric substrate with at least one ethylenically unsaturated monomer and a type II photo initiator to form a reaction mixture and wherein the reaction mixture is subjected to actinic radiation to induce grafting of monomer onto the substrate and photo polymerisation to form a polymeric surfactant.

Preferably, the method employs any of the aforementioned features relating to the polymeric surfactant.

The ratio of substrate to ethylenically unsaturated monomer will be appropriate to provide the desired ratio of substrate component to grafted polymer chains as described above.

The amount of type II photo initiator will depend upon many factors, including choice of photo initiator, substrate, monomer and solvent (if used). Typically the photo initiator may be used in amount of 0.005-30% w/w upon substrate.

It is particularly preferable to use ultraviolet light as the actinic radiation. The UV light source may include low, medium or high-pressure UV lamps, metal halide lamps, microwave-stimulated metal vapor lamps, carbon arc lamps, xenon arc lamps, excimer lamps, superactinic fluorescent tubes, fluorescent lamps or light emitting diodes, and the UV spectral output should ideally match the UV absorbance of the chosen photoinitiator.

A suitable UV light source for a typical photoinitiator such as benzophenone can be a medium pressure mercury UV lamp. Desirably, the UV light should have a wavelength in the range of 200-500 nm and a peak power density of at least 0.1 $mW/cm^2$ and normally at least 0.5 $mW/cm^2$. Usually the peak power density will be in the range of 1 $mW/cm^2$ to 200 $W/cm^2$, and typically 1.5 $mW/cm^2$ to 100 $mW/cm^2$. The exposure length of the UV irradiation can be as short as a fraction of a second to several hours. Typically, the irradiation will be for a duration of 1-300 minutes.

The UV light source can be applied to the reactants internally or externally provided there is no barrier to the specific wavelength of UV light that is required by the photoinitiator to function.

The reactant mixture can be introduced into the reactor vessel separately, together as a mixture, or passed through an irradiating chamber in a continuous fashion, or can be recycled with similar or different monomer/initiators mixtures.

The reactants can be degassed in order to remove unwanted oxygen from the reaction medium. Degassing is typically carried out by passing an inert gas such as nitrogen to the liquid reaction medium for sufficient time and after sufficient rate to remove dissolved and entrained oxygen or by using a vacuum technique (3 or 4 freeze-pump thaw cycles) at $<10^{-4}$ Torr.

The photopolymerisation reaction can be carried out in a range of suitable solvents. Preferably, the solvents should not participate as hydrogen donors in the photo initiation step. The solvents which can be used for this purpose include amongst others methanol, toluene, cyclohexane, acetonitrile, dimethylformamide and water etc.

Therefore in one preferred form of the method of preparing the polymeric surfactant, the substrate, ethylenically unsaturated monomer and type II photo initiator are combined together in a suitable solvent to form a reaction mixture. All of the components may be dissolved in the solvent or one or more of the components may be dispersed throughout the solvent, provided that this does not adversely affect the reaction. The reaction mixture is then irradiated using UV light to initiate the reaction. The solvent used can be present in an amount of 10-90% of the reaction mixture.

The photopolymerisation reaction can be carried out at a range of different temperatures, isothermally or adibatically. Typical temperature ranges include 10-100° C.

The polymeric surfactant of the present invention, which can be obtained by the aforementioned method, is particularly suitable for stabilising an interface between phases in an emulsion or a dispersion.

Thus according to a still further aspect of the present invention we provide a composition comprising a discontinuous phase distributed throughout a continuous phase comprising an interface between phases and in which a polymeric surfactant is located at the interface, in which the polymeric surfactant is formed by the reaction of an oligomeric or polymeric substrate with at least one ethylenically unsaturated monomer, wherein the reaction is conducted in the presence of a type II photo initiator and by the action of actinic radiation.

Preferably, the method employs any of the aforementioned preferred features relating to the polymeric surfactant.

This aspect of the present invention is applicable to any multiphase system typically stabilised by surfactants. Generally, the composition can be water-based or oil based. By an oil based system we mean that the continuous phase comprises a hydrocarbon or other water immiscible or hydrophobic liquid. Typically in such an oil based system the discontinuous phase will comprise a substance which is insoluble in and immiscible with the continuous phase. This may for instance be a polar organic liquid, such as ethanol or methanol. However, preferably the discontinuous phase is aqueous.

In another form, the composition can be water-based and in which case the continuous phase is aqueous. In the same way as in the oil based system, the discontinuous phase should comprise a substance which is insoluble in and immiscible with the continuous phase. Preferably, the discontinuous phase comprises a hydrocarbon or a water immiscible liquid.

In the case of either an oil based composition or a water-based composition it is preferred that the polymeric surfactant is dissolved in the continuous phase. Thus in a preferred system, the polymeric surfactant is located at the interface between phases but preferentially partitions into the continuous phase. In one particularly preferred composition two polymeric surfactants according to the invention are employed, one of which is preferentially dissolved in the continuous phase and a second polymeric surfactant is preparation dissolved in the discontinuous phase. Such a system includes doubly stabilised emulsions that are highly stable.

The invention includes systems in which the continuous phase acts as a carrier for ingredients held in the discontinuous phase. For instance the composition may comprise an emulsion in which the discontinuous phase comprises at least one ethylenically unsaturated monomer. The continuous phase may be either an oil or aqueous liquid depending upon the monomer. Thus such a system is useful for emulsion polymerisation and the formation of emulsions or dispersions comprising in the discontinuous phase a polymer formed from at least one ethylenically unsaturated monomer.

Other emulsions or dispersions according to the invention include aqueous emulsions of agriculturally active substances such as herbicides or pesticides.

The composition may for instance be an aqueous emulsion paint. In one preferred form the composition is an aqueous alkyd resin paint formulation in which the continuous phase is aqueous and the discontinuous phase comprises the alkyd resin.

Alternatively, the composition may be for instance an oil in water in oil emulsion or a water in oil in water emulsion.

The discontinuous phase of the composition may be particulate solid. Typically, the particulate solid is selected from the group consisting of calcium carbonate, titanium dioxide, kaolinite, swellable clays, barium sulphate and pigments. Thus the composition may be any of the group consisting of filler dispersions, microparticulate retention aid dispersions, drilling muds and pigment dispersions.

In the case where the composition is an emulsion method comprises dissolving or dispersing the polymeric surfactant into a first liquid and mixing a second liquid, which is immiscible with the first liquid and then forming the emulsion. Analogously, but the composition is a dispersion of a particulates solid, it may be prepared by dissolving the polymeric surfactant into a liquid continuous phase and mixing a particulate solid into the liquid continuous phase and then forming the dispersion.

The following examples are illustrations of the invention.

EXAMPLE 1

Preparation of 7:3 w/w PEG 2000:MA Graft Polymer Using Benzophenone, and its Emulsification Properties 6.1 g Methyl acrylate (MA) and 14.0 g PEG 2000 were added to a jar. Methanol (16.9 g) was added to jar pipette wise until all PEG 2000 dissolved. 0.25 g Benzophenone was added to the PEG/MA and the sample mixed until homogenous.

The homogenous sample (2.0 g) was weighed into 10 mL borosilicate glass tube. The sample was placed under a medium pressure Hg Black Ray UV lamp 360-370 nm, 40 mW/cm$^2$. After 15 min the sample was rotated through 180° to ensure complete irradiation of the whole sample to form a polymerised product.

GC analysis of the sample, pre-radiation and after 30 min of UV exposure, was performed. It was found that all of the MA had reacted (>99.5%) and therefore irradiation was discontinued.

After UV irradiation the sample of polymerised product was still mobile Methanol was removed prior to the polymer being tested for emulsification properties.

The polymerised product sample (1.5 g) was put into rotary florin, and dried on the rotary evaporator, 50° C., 100 mbar vac until at constant weight. 1.1 g of dry polymer was obtained and the emulsification test involved dissolving the polymer in 9.0 g toluene (about 10 wt/wt %). 4.5 g of polymer/toluene solution was transferred to a sealed tube and 5 g of de-ionised water added. The sample was shaken and left to stand for 5 weeks and signs of destabilisation such as phase separation and flocculation were notably absent in the formed oil in water emulsion This was in stark contrast to similarly formed emulsions consisting of PEG 2000/polymethylacrylate combinations, where destabilisation was observed within hours.

EXAMPLE 2

Preparation of 1:1:5.4 w/w/w Poly(DMAEA):butylacrylate:acrylamide Graft Copolymer (Polymer A) Using Benzophenone and Use as a Pigment Dispersant (All Darts by Weight)

Dimethylaminoethylacrylate (DMAEA) (23 parts), n-butylacrylate (24 parts), methanol (37 parts) and benzophenone (1 part) were added a borosilicate glass tube, capped and shaken until the mixture was fully homogeneous. The tube was next placed almost horizontally under a medium pressure Hg Black Ray UV lamp rotated slowly and irradiated at 360-370 nm, 40 mW/cm$^2$ for 12 minutes. Analysis of the product after this time by gas chromatography indicated that >95% of the DMAEA and n-butylacrylate had been consumed. The sample was allowed to rotate under the UV light for a further 60 minutes to allow any residual monomers to react.

Part of this product mixture (7.5 parts) was transferred to a second borosilicate tube containing benzophenone (1 part), acrylamide (13 parts) and methanol (46 parts). After capping, the mixture was shaken until it became homogeneous. This reaction mixture was then subjected to UV irradiation. After a few minutes a white precipitate formed and the sample was irradiated with the UV light for a total of 30 minutes to ensure that all the monomers had been fully reacted. The solvent was removed by heating to 70 degrees C for 15 minutes to afford the graft copolymer as a hard clear film (Polymer A).

Evaluation of Polymer A as a Pigment Dispersant.

Polymer A (0.5 parts) was added to an aqueous suspension (100 parts of 5% w/w) of Pigment Blue 60 (available from Ciba Specialty Chemicals Ltd), mixed well by hand, and dried at 80° C. for 1 hour. The solid recovered was added to water (50 mg per 200 mL) and gently stirred for 10 minutes. A stable dispersion of the pigment was formed showing good colour density. As a control the equivalent aqueous suspension of Pigment Blue 60 in the absence of Polymer A did not form a stable dispersion and the pigment started to settle to form a sediment.

EXAMPLE 3

Preparation of a Castor Oil:Polyvinylpyrrolidone Graft Polymer Using Benzophenone, and its Emulsifying Properties 0.0144 g Benzophenone, 0.5141 g castor oil and 1.2098 g 1-vinyl-2-pyrrolidinone were weighed into a 10 mL borosilicate glass tube. The sample was placed under a medium pressure Hg Black Ray UV lamp 360-370 nm, 40 mW/cm$^2$. After 120 minutes the sample has completely gelled to form a polymerised product.

The product was dried in an oven at 90° C. for 15 minutes and demonstrated its polymeric surfactant qualities using the emulsification test as outlined in example 1.

A Castor oil: Polyvinylpyrrolidone copolymer made using a thermal free radical polymerisation produced a material that did not show any ability to emulsify a water:toluene mixture;

0.3378 g castor oil, 0.9138 g 1-vinyl-2-pyrrolidinone and 0.0354 g Luperox 11M75 were weighed into 10 mL borosilicate glass tube and the tube contents heated to 80° C. at which the mixture polymerised to a gel.

EXAMPLE 4

Preparation of a Polyethyleneglycol 2000:Vinylidene Chloride Graft Copolymer and Resulting Emulsifying Properties 0.0091 g Benzophenone and 0.5826 g polyethyleneglycol 2000 dissolved in 0.5926 g of methanol and 0.3590 g of vinylidene chloride were weighed into a 10 mL borosilicate glass tube. The sample was placed under a medium pressure Hg Black Ray UV lamp 360-370 nm, 40 mW/cm$^2$. After 120 minutes the UV irradiation of the sample was ceased and the tube contents dried in an oven at 90° C. for 15 minutes, the resulting polymeric product was shown to possess surfactant qualities using the emulsification test as outlined in example 1.

EXAMPLE 5

Preparation of a Polyethyleneglycol 600:Vinylidene Chloride Graft Copolymer and Emulsifying Properties of the Resulting Graft Copolymer 0.0061 g Benzophenone, 0.0979 g polyethyleneglycol 600 and 1.6606 g of vinylidene chloride were weighed into 10 mL borosilicate glass tube. The sample was placed under a medium pressure Hg Black Ray UV lamp 360-370 nm, 40 mW/cm$^2$. After 60 minutes the UV irradiation of the sample was ceased and the contents of tube carefully bubbled with nitrogen gas for 15 minutes to evaporate off unreacted vinylidene chloride monomer, the resulting polymeric product residue was shown to possess surfactant qualities using the emulsification test as outlined in example 1.

EXAMPLE 6

Preparation of a Polydimethylacrylamide:n-Butyl Acrylate Graft Polymer and its Emulsifying Properties A mixture comprising 0.0999 g Benzophenone, 8.4230 g of an 84% w/w solution of polydimethylacrylamide in methanol and 1.4712 g n-Butyl acrylate were placed in a borosilicate glass petridish (11 cm diameter and 2 cm deep). The petri dish containing the mixture was placed at a distance of 6 cm under a medium pressure Hg Black Ray UV lamp 360-370 nm, 40 mW/cm$^2$. After 30 minutes the sample had completely gelled to form a polymeric film. This polymer film product demonstrated its polymeric surfactant qualities using the emulsification test as outlined in example 1.

EXAMPLE 7

Preparation of a PEG 2000:MA Graft Polymer Employing a 2-Phase System and a Water Soluble Photoinitiator A mixture comprising 5.000 g of a 50% aqueous polyethylenegylcol 2000 solution, 0.0590 g (4-Benzoylbenzyl)trimethylammonium chloride and 1.1093 g methyl acrylate were placed in a 10 mL borosilicate glass tube, a dispersion unit (IKA-ULTRA-TURRAX T 25 basic using a S25N-8G dispersion tool) was used to emulsify the mixture (set to a speed of 24,000 1/min) and the tube contents were irradiated using a medium pressure Hg Black Ray UV lamp 360-370 nm, 40 mW/cm$^2$. After 30 minutes of UV irradiation GC analysis of the reaction mixture indicated that all the monomer had been consumed and the resulting product was dried in an oven at 75° C. for 10 minutes. The dried sample demonstrated its polymeric surfactant quailities using the emulsification test as outlined in example 1.

The invention claimed is:

1. A method of producing a polymeric surfactant comprising contacting an oligomeric or polymeric substrate with at least one ethylenically unsaturated monomer and a type II photo initiator to form a reaction mixture and wherein the reaction mixture is subject to actinic radiation to induce grafting of monomer onto the substrate and photo polymerisation to form a polymeric surfactant, wherein the reactants are dissolved in a solvent.

2. A method according to claim 1 in which the solvent is selected from the group consisting of methanol, toluene, cyclohexane, acetonitrile, dimethylformamide and water.

* * * * *

UNITED STATES PATENT AND TRADEMARK OFFICE
CERTIFICATE OF CORRECTION

| | | |
|---|---|---|
| PATENT NO. | : 7,642,298 B2 | Page 1 of 1 |
| APPLICATION NO. | : 10/559892 | |
| DATED | : January 5, 2010 | |
| INVENTOR(S) | : Michael Singh | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 743 days.

Signed and Sealed this

Sixteenth Day of November, 2010

David J. Kappos
*Director of the United States Patent and Trademark Office*